United States Patent
Carroll et al.

(10) Patent No.: US 11,622,642 B2
(45) Date of Patent: Apr. 11, 2023

(54) SYSTEM FOR HOLDING TABLEWARE ON A TABLE

(71) Applicants: Jodi A Carroll, Winfield, IL (US); James Robert Carroll, Winfield, IL (US); Sandra Winifred Foguth, Fenton, MI (US)

(72) Inventors: Jodi A Carroll, Winfield, IL (US); James Robert Carroll, Winfield, IL (US); Sandra Winifred Foguth, Fenton, MI (US)

(73) Assignee: STAY PUT COASTERS, LLC, Winfield, IL (US)

( * ) Notice: Subject to any disclaimer, the term of this patent is extended or adjusted under 35 U.S.C. 154(b) by 276 days.

(21) Appl. No.: 16/773,832

(22) Filed: Jan. 27, 2020

(65) Prior Publication Data
US 2020/0260895 A1    Aug. 20, 2020

Related U.S. Application Data

(63) Continuation-in-part of application No. 15/979,125, filed on May 14, 2018, now Pat. No. 10,561,260.
(Continued)

(51) Int. Cl.
*A47G 29/087* (2006.01)
*F16B 1/00* (2006.01)
(Continued)

(52) U.S. Cl.
CPC .......... *A47G 29/087* (2013.01); *A47G 11/001* (2013.01); *A47G 19/06* (2013.01);
(Continued)

(58) Field of Classification Search
CPC ............ B65D 2313/10; B65D 71/0085; B65D 2313/00; B65D 2313/04; A47G 29/087;
(Continued)

(56) References Cited

U.S. PATENT DOCUMENTS 425,768 A    4/1890    Ezell
879,364 A    2/1908    Cohen
(Continued)

FOREIGN PATENT DOCUMENTS

CN    201840124 U    5/2011
DE    202005001031 U1    2/2006

OTHER PUBLICATIONS

Wikipedia, "Ferromagnetism", Mar. 9, 2017 (Mar. 9, 2017); retrieved on Jul. 26, 2018 from https://enwikipedia.org/w/index.php?title=Ferromagnetism&oldid=769451801.

*Primary Examiner* — Kareen K Thomas
(74) *Attorney, Agent, or Firm* — Erickson Law Group, PC

(57) ABSTRACT

The invention provides a supported body having a magnetic or ferromagnetic component to adhere the supported body to a magnetic or ferromagnetic support, such as a table top by magnetic attraction. A reusable adhering component, such as a stretch-releasable pressure sensitive adhesive tape is disposed on a top surface of the supported body to removably attach tableware or dishware to the supported body. The supported body can be in the form of a plate, a coaster, a placemat, or other known configuration. Alternatively, a support body can be releasably secured to a table top or other support surface by a releasable attaching device such as a suction cup and a supported body can be releasably attached to a piece of tableware or dishware by a releasable attaching device such as a suction cup, and the support body and the supported body can be magnetically attached to each other.

20 Claims, 14 Drawing Sheets

Related U.S. Application Data

(60) Provisional application No. 62/898,337, filed on Sep. 10, 2019, provisional application No. 62/867,651, filed on Jun. 27, 2019, provisional application No. 62/518,142, filed on Jun. 12, 2017, provisional application No. 62/506,384, filed on May 15, 2017.

(51) Int. Cl.
*A47G 19/06* (2006.01)
*A47G 19/10* (2006.01)
*A47G 11/00* (2006.01)

(52) U.S. Cl.
CPC ............... *A47G 19/10* (2013.01); *F16B 1/00* (2013.01); *F16B 2001/0035* (2013.01)

(58) Field of Classification Search
CPC ...... A47G 11/001; A47G 19/06; A47G 19/10; A47G 2200/106; F16B 1/00; F16B 2001/0035
See application file for complete search history.

(56) References Cited

U.S. PATENT DOCUMENTS

| | | | |
|---|---|---|---|
| 2,217,514 A | 10/1940 | Henry | |
| 3,013,688 A | 12/1961 | Luning | |
| 3,143,374 A * | 8/1964 | Corboni | A47D 1/008 |
| | | | 248/117.7 |
| 3,285,456 A | 11/1966 | Pewitt | |
| 3,524,614 A | 8/1970 | Sorth | |
| 4,024,312 A | 5/1977 | Korpman | |
| 5,031,874 A | 7/1991 | Shannon | |
| 5,186,350 A | 2/1993 | McBride | |
| 5,366,103 A | 11/1994 | Abernathy et al. | |
| 5,516,581 A | 5/1996 | Kreckel et al. | |
| 5,873,486 A | 2/1999 | Morgan | |
| 6,001,471 A | 12/1999 | Bries et al. | |
| 6,179,377 B1 | 1/2001 | Harper | |
| 6,302,363 B1 | 10/2001 | Olson et al. | |
| 6,305,656 B1 | 10/2001 | Wemyss | |
| 6,572,945 B2 | 6/2003 | Bries et al. | |
| 6,972,141 B1 | 12/2005 | Bries et al. | |
| 7,600,486 B2 | 10/2009 | Ellis | |
| 7,637,388 B2 | 12/2009 | Schantz et al. | |
| 8,002,140 B2 | 8/2011 | Schantz et al. | |
| 8,251,247 B1 | 8/2012 | Breckner | |
| 8,302,806 B1 | 11/2012 | Gibbar | |
| 8,334,037 B2 | 12/2012 | Sheridan et al. | |
| 9,144,321 B2 * | 9/2015 | Melo | A47G 11/004 |
| 10,561,260 B2 | 2/2020 | Carroll et al. | |
| 10,856,680 B2 * | 12/2020 | Fritz | C03B 11/06 |
| 11,026,529 B2 * | 6/2021 | Ferraro | A47G 19/2261 |
| 2006/0207993 A1 | 9/2006 | Copeland | |
| 2007/0039966 A1 * | 2/2007 | Schantz | A47J 19/02 |
| | | | 220/574 |
| 2010/0154683 A1 * | 6/2010 | Royka | A47G 21/167 |
| | | | 108/28 |
| 2010/0176253 A1 | 7/2010 | Son | |
| 2011/0072978 A1 | 3/2011 | Popescu | |
| 2011/0031559 A1 | 12/2011 | Angus et al. | |
| 2011/0315593 A1 * | 12/2011 | Angus | A45F 3/46 |
| | | | 206/541 |
| 2013/0098924 A1 | 4/2013 | Tate | |
| 2013/0105492 A1 * | 5/2013 | Melgoza | A47G 19/10 |
| | | | 220/574 |
| 2014/0299608 A1 | 10/2014 | Melo | |
| 2014/0304953 A1 | 10/2014 | Crosby et al. | |
| 2015/0001228 A1 | 1/2015 | Rapp | |
| 2015/0173536 A1 | 6/2015 | Frangione | |
| 2016/0058220 A1 | 3/2016 | Dixon | |
| 2016/0249768 A1 | 9/2016 | Casey et al. | |
| 2019/0133351 A1 | 5/2019 | Carroll et al. | |

\* cited by examiner

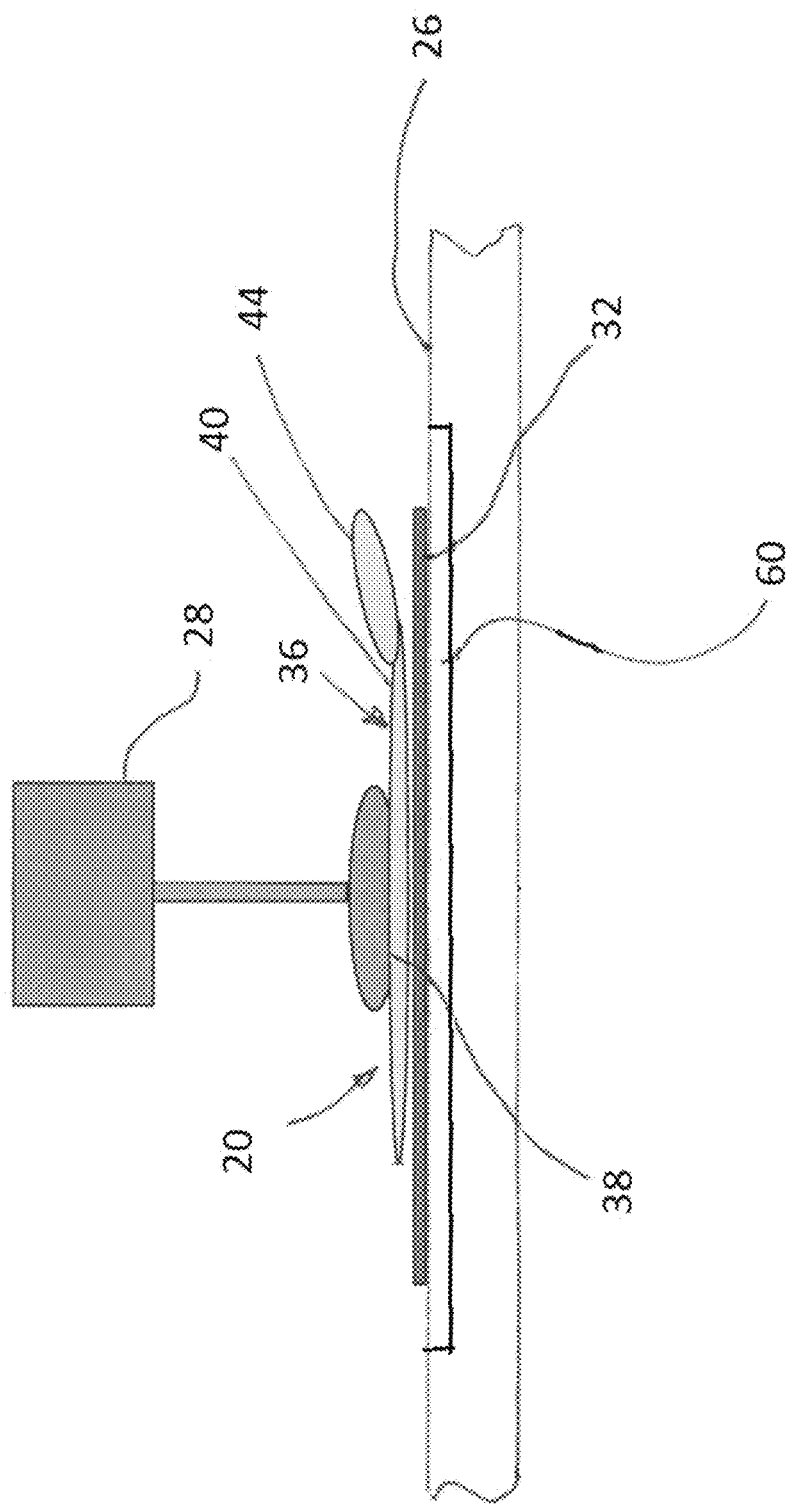

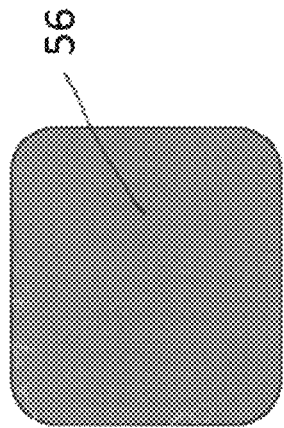
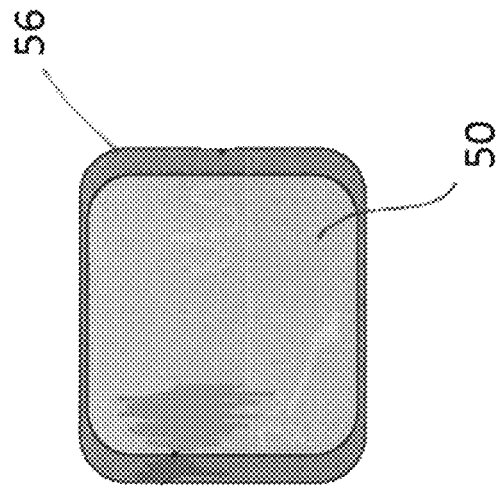

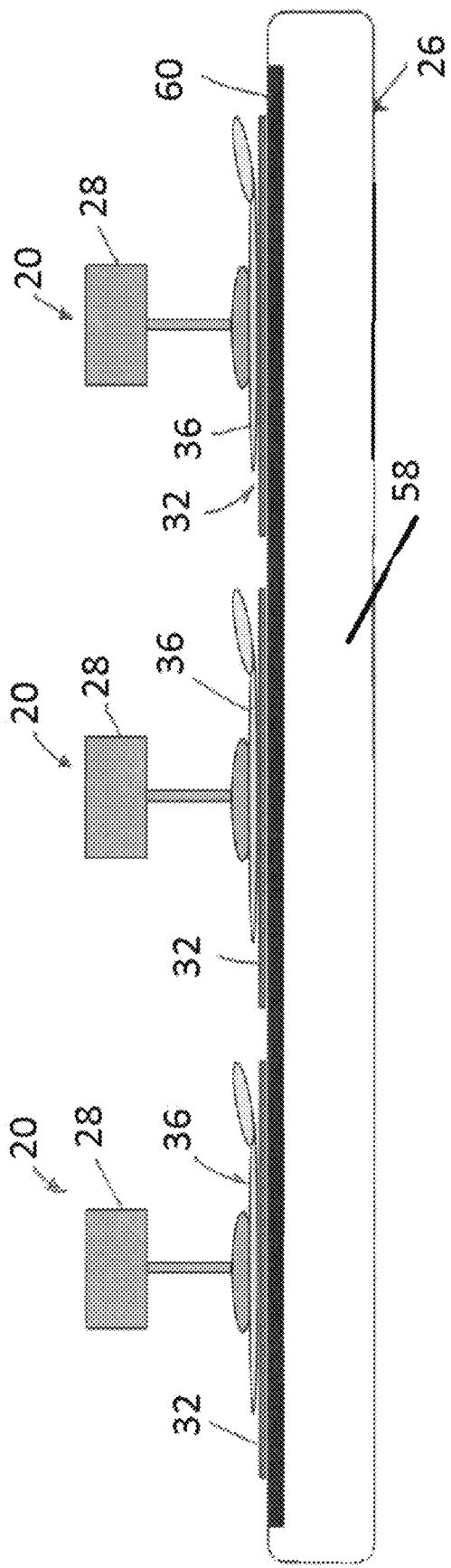

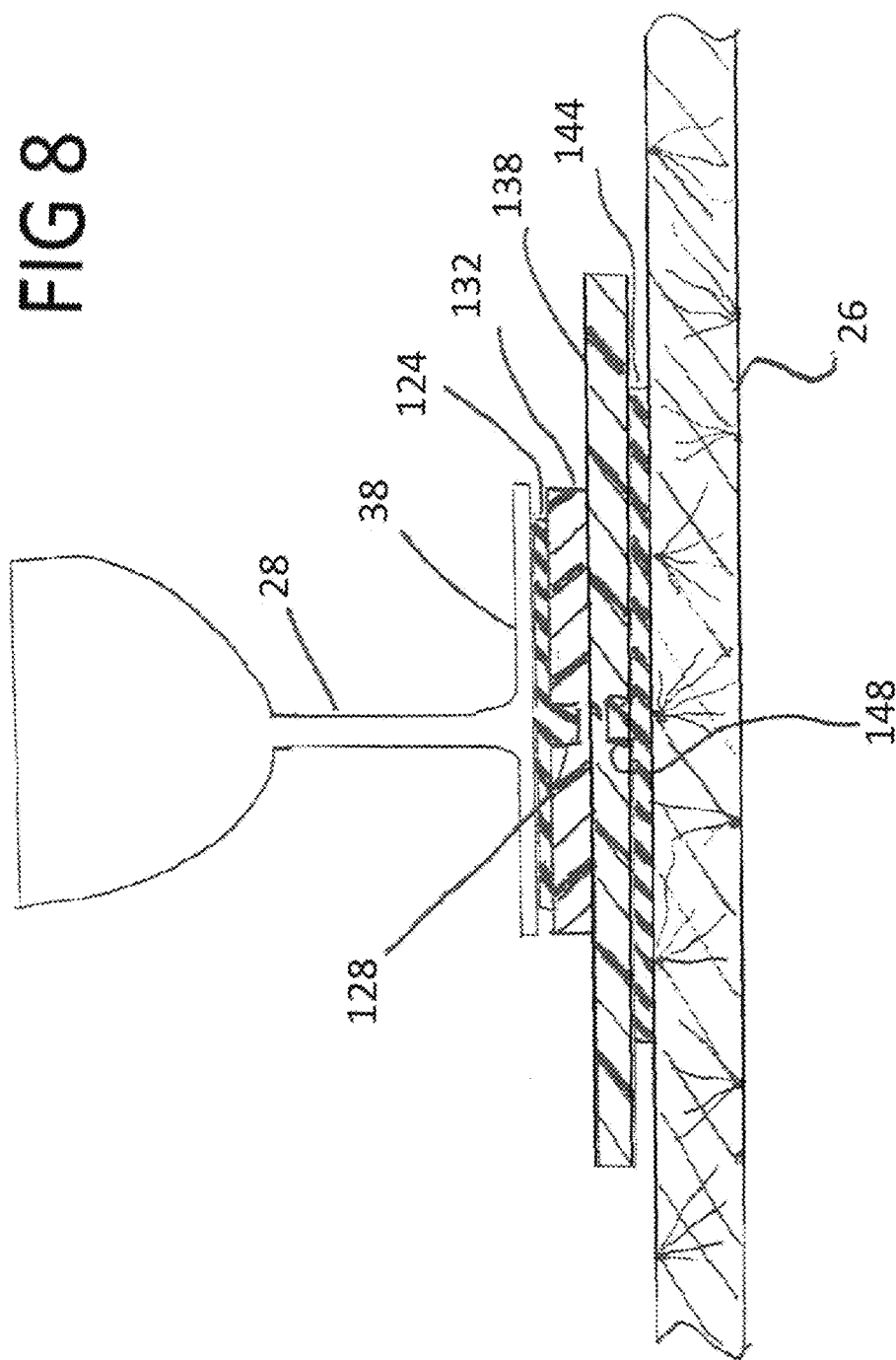

SYSTEM FOR HOLDING TABLEWARE ON A TABLE

This application claims the benefit of U.S. Provisional Application 62/898,337 filed Sep. 10, 2019 and U.S. Provisional Application 62/867,651 filed Jun. 27, 2019; and is a continuation-in-part of U.S. Ser. No. 15/979,125 filed May 14, 2018 which claims the benefit of U.S. Provisional Application 62/506,384 filed May 15, 2017 and U.S. Provisional Application 62/518,142 filed Jun. 12, 2017.

BACKGROUND

Systems for holding tableware to a table or support surface are known. Particularly, U.S. Patent 425,768; and Published Applications US20130098924 and US20130105492, describe magnetic systems for holding tableware and drinking vessels to tables, particularly for holding these to the table in environments where external forces such as the rolling of a ship at sea or high winds during outdoor dining, would otherwise cause the tableware to be tipped over or thrown off the table.

The present inventor has recognized that it would be desirable to provide an improved system that held tableware to a table or support surface that is easy to use, easy to make compatible with existing dishes, that was flexible to make the dishes able to be used in a microwave oven and cleaned in a dishwasher.

SUMMARY

The exemplary embodiments of the present invention provide a supported body having a magnetic or ferromagnetic component to adhere the support body to a magnetic or ferromagnetic support by magnetic attraction. A reusable adhering component is disposed on a top surface of the supported body to removably attach tableware or dishware to the supported body.

The supported body can be in the form of a plate, a coaster, a placemat, or other known configuration.

According to one embodiment, the reusable adhering component comprises stretch-releasable pressure sensitive adhesive tape. According to another embodiment, the reusable adhering component comprises double sided tape or hook and loop tapes adhered respectively to each of the support body and the item of tableware or dishware.

The illustrated embodiments of the invention provide a system for adhering tableware or dishware to a support such as a table, including a supported body having a magnetic or ferromagnetic component; the support having a magnetic or ferromagnetic component for attaching the supported body to the support by magnetic attraction; and a reusable adhering component arranged on the supported body on a top surface thereof. The magnetic or ferromagnetic component can be one or more magnets or a magnetic material. The magnetic material can be a planar article having magnetic particles within the planar article.

The adhering component can comprise a stretch-releasable pressure sensitive adhesive tape. The adhering component can alternatively comprise a double sided adhesive tape. The adhering component could alternatively comprise a hook and loop fastener with cooperating surfaces adhered to the supported body and the tableware or dishware.

The support surface can be provided by a conventional table, a floating table, a lap table, a placemat or other type support. The table, particularly in the case of a lap style or tray style table, can be configured to float in water and/or be securable to boat tables, jet tables, RV tables, patio tables, etc., in order to secure them in place.

The dishes or other tableware or dishware can be secured while in motion, to prevent tipping due to waves, wind, turbulence, or bumps.

According to the invention, the adhering component can be parted to separate an item of tableware or dishware from the supported body. Thus, if the item of tableware or dishware is composed of a microwave compatible material, the supported body, which has magnets or magnetic material thereon or therein (not microwavable), can be separated from the item of tableware or dishware so the item of tableware or dishware can be used to heat food in a microwave. Also, the supported body, which has magnets or magnetic material thereon or therein, can be separated from the item of tableware or dishware so the item of tableware or dishware can be washed more conveniently in a sink or dishwasher. Also, the adhering component can be compatible with existing tableware or dishware so a consumer would not be required to purchase custom tableware or dishware to use the system.

According to a further embodiment of the invention, a support body, such as a plate, placemat, coaster, or the like, is attached to a releasable and reusable attaching device, such as a suction cup, on a bottom side of the support body. The support body can be composed of a ferromagnetic material or a magnetic material. The support body can be rigid or flexible. The suction cup is readily attachable to a conventional table or other support surface. The suction cup can be releasable from the support surface by a button or lever, as is known. A supported body, such as a plate or coaster, is attached to a releasable and reusable attaching device, such as a suction cup, on a top side of the supported body. The supported body can be composed of a ferromagnetic material or a magnetic material, selected to be magnetically attracted to the support body. The supported body can be rigid or flexible. The suction cup is readily attachable to a dishware, such as saucers, plates, bowls, drinking glasses, cups, stemware, or other dishware. The suction cup can be releasable from the support surface by a button or lever, as is known. According to this embodiment, the support body can be releasably attached to a support surface. The supported body can be releasably attached to a piece of dishware. The supported body is then magnetically attached to the support body. The releasable attachments, such as the suction cups, have a holding strength that is greater than the magnetic attraction between the supported body and the support body. A user can readily lift a glass or other dishware, with the supported body attached, from the support body by overcoming the magnetic attraction.

According to this embodiment, a magnetic dish holding arrangement can be provided that is compatible with conventional tables, such as wooden tables, or other support surface and is compatible with conventional dishware. The releasable attachments, such as suction cups, can be completely separated from the support surface and the dishware to clean the dishware and the support surface independent of the support body or the supported body.

According to further embodiments, tableware or dishware can be provided with mechanical features to removably mechanically fix the tableware or dishware to a supported body having an embedded magnet for magnetic attraction to a support body. The mechanical connection can comprise one or more cavities in a bottom of the tableware or dishware and corresponding one or more pegs on the top surface of the supported body. Alternatively, the mechanical connection can be a treaded cavity in the tableware or dishware and a threaded stud protruding from the supported body. Further the mechanical connection can be a bayonet style connection between a headed peg on the supported body and a bayonet slot in the bottom of the tableware or dishware.

The mechanical connection provides that the tableware or dishware can have a flat surface with one or more cavities, allowing the tableware or dishware to be used for dining with or without the supported base. The tableware or dishware can be washed separately from the supported body, saving the supported body and its magnet from repeated washing.

Removable lips can be provided that can snap on the top rim of drinking vessels, bowls and plates to prevent sloshing and spilling of liquids during rough wave conditions during dining on boats. Removability of the lips allows for easier cleaning and storing of the tableware or dishware.

The support surface can be provided by a conventional table, a floating table, a lap table, a placemat or other type support. The table, particularly in the case of a lap style or tray style table, can be configured to float in water and/or be securable to boat tables, jet tables, RV tables, patio tables, etc., in order to secure them in place.

The dishes or other tableware or dishware can be secured while in motion, to prevent tipping due to waves, wind, turbulence, or bumps.

Numerous other advantages and features of the present invention will be become readily apparent from the following detailed description of the invention and the embodiments thereof, and from the accompanying drawings.

BRIEF DESCRIPTION OF THE DRAWINGS

FIG. 1 is a schematic side view of a system according to the invention for holding tableware or dishware to a magnetic table or support surface;

FIG. 2 is a bottom view of a support taken from FIG. 1;

FIG. 3 is a plan view of the support shown in FIG. 2;

FIG. 5 is a schematic side view of the system of FIG. 1 including a floating magnetic table;

FIG. 8 is a sectional view of an alternate embodiment system according to the invention;

DETAILED DESCRIPTION

Figure 4:
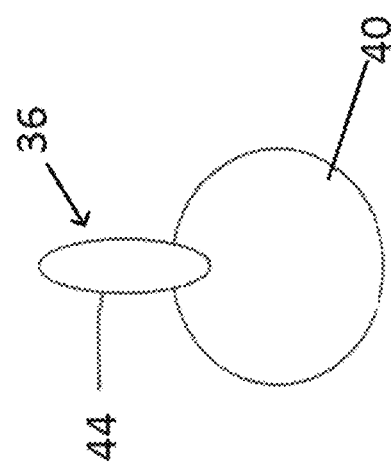
FIG. 4 is a schematic plan view of an adhering component taken from FIG. 1.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Provisional Application 62/898,337 filed Sep. 10, 2019, U.S. Provisional Application 62/867,651 filed Jun. 27, 2019, U.S. Ser. No. 15/979,125 filed May 14, 2018, U.S. Provisional Application 62/506,384 filed May 15, 2017 and U.S. Provisional Application 62/518,142 filed Jun. 12, 2017.

FIG. 1 shows a system 20 for holding an item of tableware or dishware 28, such as a stemware glass, to a support surface such as a table 26. The system 20 includes a supported body 32 and an adhering component 36. The supported body 32 can be a flat, square shape as shown in FIGS. 2 and 3, or any other shape such as round. The supported body 32 can be rigid, flexible or soft. The table 26 can be a traditional table, a placemat, a lap table, a floating support, or other type support.

The adhering component 36 illustrated can be a reusable element such as one described in U.S. Pat. Nos. 8,334,037; 6,972,141; 6,572,945, all hereby incorporated by reference to the extent they are not inconsistent with the present disclosure. This type component includes an adhering body 40 attached to a pull tab 44.

The adhering component 36 can be a stretch-releasable pressure sensitive adhesive such as described in U.S. Pat. Nos. 4,024,312 and 5,516,581; and sold commercially as COMMAND by 3M Company, St. Paul, Minn., US, all of which are hereby incorporated by reference to the extent they are not inconsistent with the present disclosure.

Alternately, the adhering component 36 can comprise a mating pair of hook and loop tapes, other reusable double sided tapes, or other type of reusable adhering components.

The item of tableware or dishware 28 includes a bottom surface 38 that is arranged to be gripped by the adhering component 36. The tableware or dishware can be eating plates, dishes, saucers, drinking glasses, cups, bowls or any other tableware or dishware.

FIGS. 2 and 3 show the supported body 32 includes a magnetic component 50 and a supporting body portion 56. The magnetic component 50 can be inlaid into the supporting body portion 56 in order to provide a flush bottom surface to rest on a table top. The supporting body portion 56 can be rigid, flexible or soft.

The magnetic component 50 can be one or more individual magnets, or a magnetic flexible substrate, such as used in "refrigerator magnets" such as described in U.S. Pat. No. 6,302,363, hereby incorporated by reference to the extent it is not inconsistent with the present disclosure. The magnetic component 50 and the supporting body portion 56 can be a unitary article. The component 50 can be composed wholly of a flat relatively thin magnetized iron or steel sheet material or of a non-magnetic synthetic resinous plastic such as polystyrene, polypropylene, acrylic, or the like, having finely divided magnetic particles distributed throughout the component 50. Alternatively, the magnetic component 50 can be formed by a magnetic coating applied to a similar non-magnetic body.

In use, when a user wishes to lift the tableware or dishware off the table, for example to drink from the stemware glass, the supported body 32, in the form of a coaster, can be separated from the table and lifted still attached by the adhering component. Advantageously the plan view size of the coaster is about the same plan view size of the base of the stemware.

FIG. 4 illustrates the adhering component 36 having a round adhering body 40 and an elongated pull tab 44. The pull tab 44 extends out from between the tableware or dishware adhered to the supported body 32, and the supported body 32 so a user can separate the tableware or dishware from the supported body 32. The invention encompasses other shapes of the body 40 and tab 44.

FIG. 5 illustrates the system 20 of FIG. 1 applied to multiple place settings on the table 26. The table 26 includes a table top 58 including an inlaid, embedded or attached ferromagnetic layer, such as a layer 60 composed of steel or iron. Each supported body 32 is magnetically attached to the table 26, particularly to the layer 60. The table 26 can be a traditional table or a portable table, such as a lap table, a floating table, or other kind of support. In the case of a floating table, the table table top 58 can be composed of foam, balsa wood, Styrofoam, wood, polystyrene or other buoyant material.

Alternatively, the layer 60 in the table top 58 can be a magnetic layer and the magnetic component 50 can be magnetic or ferromagnetic to be attracted to the layer 60. If the layer 60 is magnetic it can be a flat relatively thin magnetized iron or steel sheet material or of a non-magnetic synthetic resinous plastic such as polystyrene, polypropylene, acrylic, or the like, having finely divided magnetic particles distributed throughout the layer 60. Alternatively, the magnetic layer 60 can be formed by a magnetic coating applied to a similar non-magnetic body.

Figure 6:
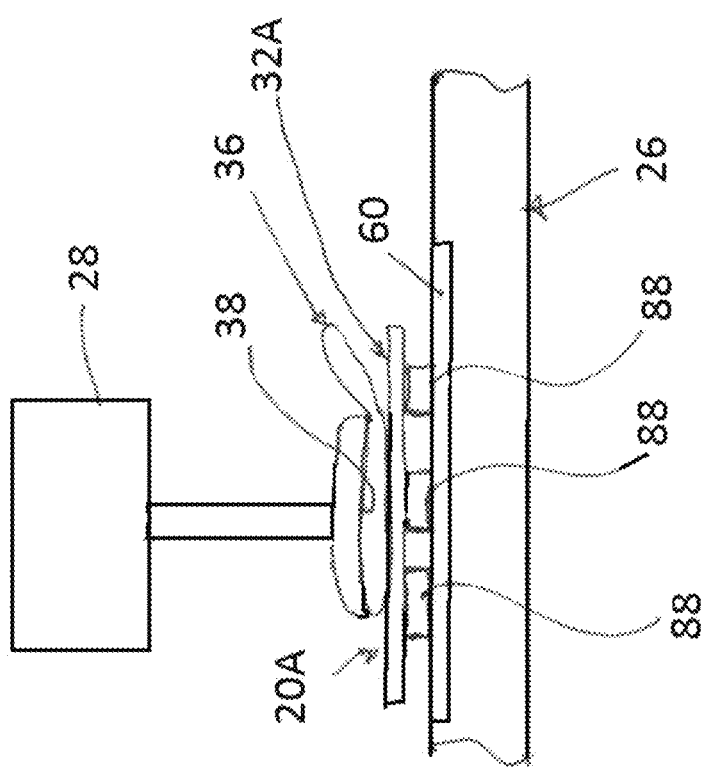
FIG. 6 is a schematic side view of an alternate system according to the invention.

FIG. 6 shows an alternate embodiment system 20A wherein the supported body 32A has a plurality of individual magnets 88 to hold the support body to the layer 60 of the table 26. The alternate supported body 32A can be otherwise as described above for the supported body 32.

Figure 7:
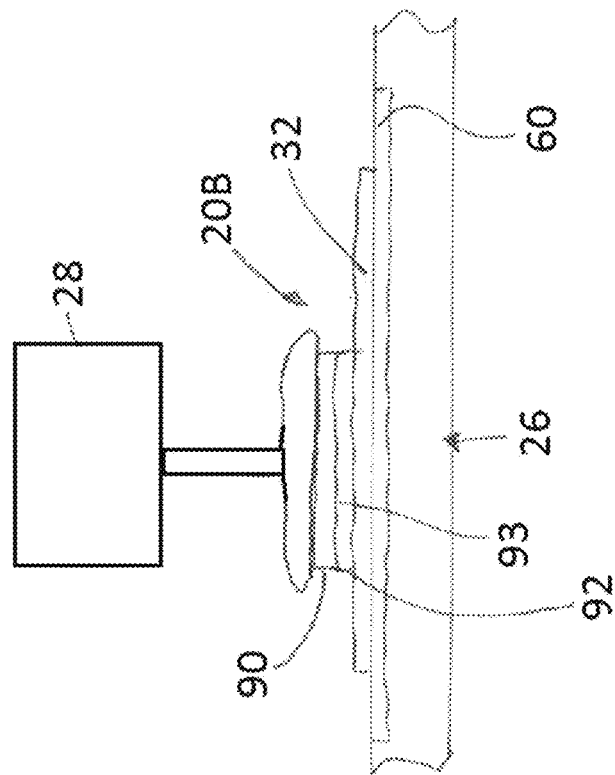
FIG. 7 is a schematic side view of a further alternate system according to the invention.

FIG. 7 shows a further alternate embodiment system 20B wherein the adhering component comprises a cooperating pair of hook and loop tapes 90, 92 that are adhesively secured to the respective tableware or dishware 28 and supported body 32 and are separable along a parting plane 93 to separate the tableware or dishware 28 from the supported body 32. The supported body 32 is otherwise the same as described above.

Figure 9:
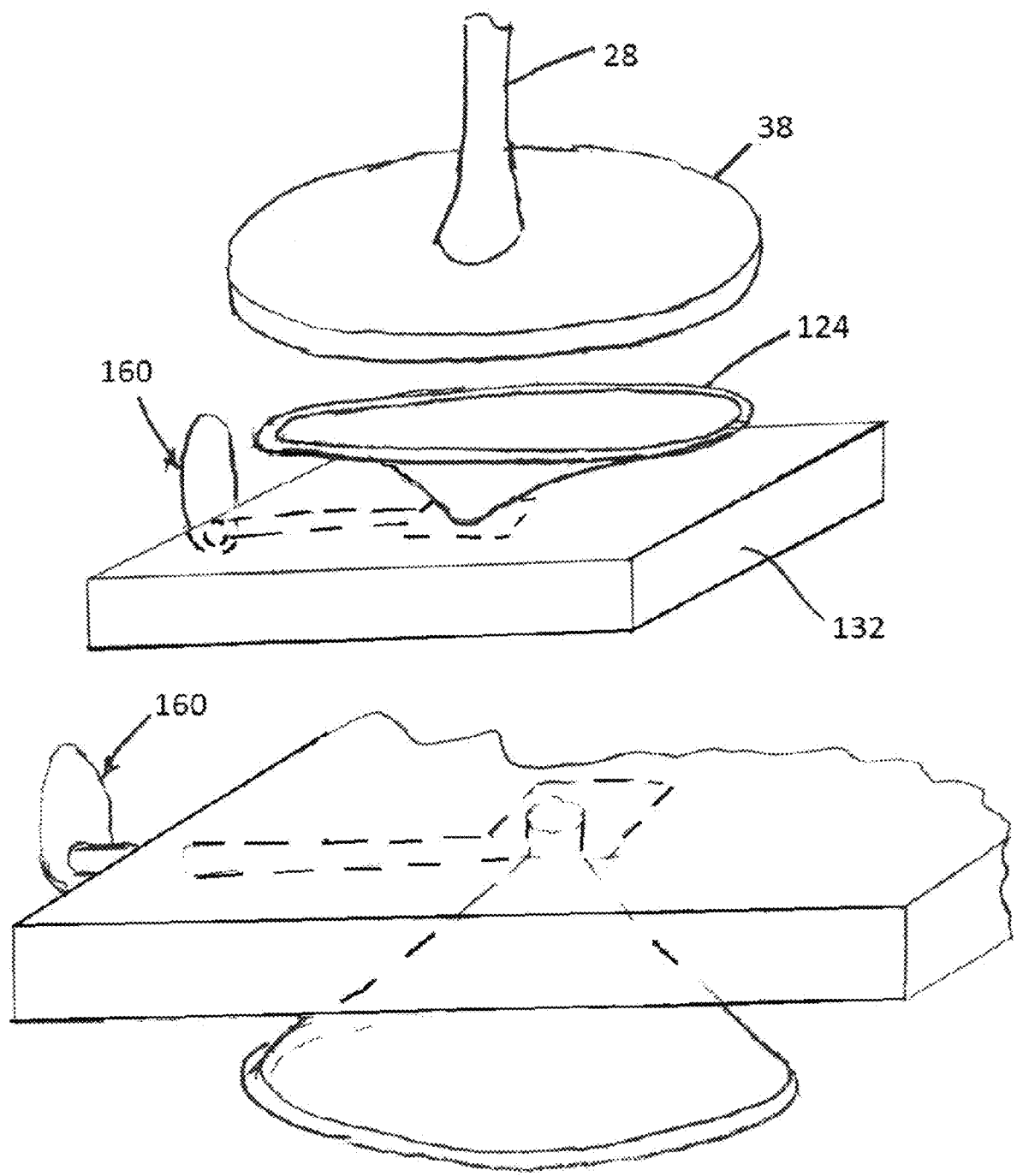
FIG. 9 is an exploded perspective view of the system according to FIG. 8.
Figure 10:
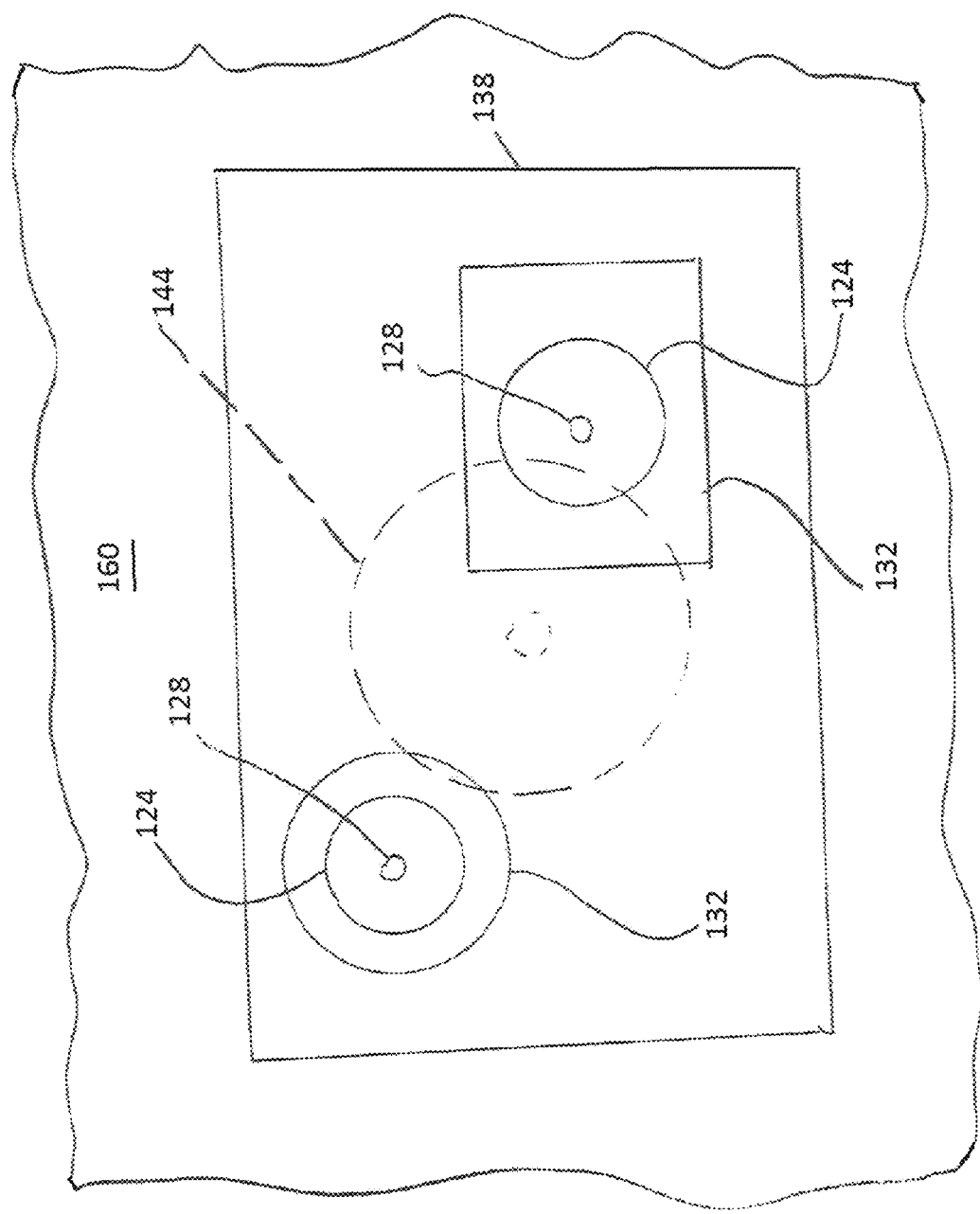
FIG. 10 is a plan view of the system of FIG. 8.

FIGS. 8-10 illustrate an alternate system 100 for holding tableware or dishware, such as the stemware 28, to a support surface, such as the table 26. For this system 100, the table 26 need not have a ferromagnetic or magnetic plate 60.

The base 38 of the stemware 28 is releasably attached to a first attaching device, such as a first suction cup 124. The suction cup is attached at its apex 128 to a supported body 132. The supported body 132 is composed of ferromagnetic or magnetic material. The supported body can be a plate that is square, round or any shape. The supported body can be rigid or flexible. Although a single suction cup is shown, multiple, smaller suction cups could be used as well.

The supported body is magnetically attached to a support body 138. The support body 138 is composed of ferromagnetic or magnetic material. The support body can be a plate that is square round or any shape. The support body can be rigid or flexible. The material of the supported body and the support body is selected to achieve a magnetic attraction therebetween. The support body 138 is attached to a second attaching device, such as a second suction cup 144. The support body 138 is attached to the second suction cup at its apex 148. The second suction cup 144 can releasably attach the support body to the support surface, such as a table 26. Although a single suction cup is shown, multiple, smaller suction cups could be used as well.

As shown in FIG. 9, each suction cup can have an effective release mechanism 160 to release the suction on the suction cup to remove either the support body 138 from the support surface of the supported body 132 from the tableware or dishware. The release mechanism is shown schematically but could be configured as described in one of the following US Patents, hereby incorporated by reference to the extend not inconsistent with the present disclosure: U.S. Pat. Nos. 9,057,398; 8,387,932; 8,066,238; 5,176,357; 5,405,112; 7,850,133; 7,878,467; 8,348,216.

According to other embodiments, the suction cups 124, 144 can be replaced by stretch-releasable pressure sensitive adhesive such as described in U.S. Pat. Nos. 4,024,312 and 5,516,581; and sold commercially as COMMAND by 3M Company, St. Paul, Minn., US, all of which are hereby incorporated by reference to the extent they are not inconsistent with the present disclosure.

Alternately, the suction cups can be replaced by GECKO type releasable adhesive fasteners such as described in published US patent applications US2016/0375654; US2016/0102804; US2016/0333228; US2014/0312188; and U.S. Pat. Nos. 9,603,419; 9,574,113; 9,440,416; 9,395,038 or U.S. Pat. No. 9,182,075, all hereby incorporated by reference to the extent they are not inconsistent with the present disclosure.

As shown in FIG. 10, the support body 138 can be larger than the supported body 132, such as embodied as a placemat holding multiple supported bodies each holding a piece of tableware or dishware such as dishes and drinking glasses (not shown).

The embodiment of FIGS. 8-10 allows for a magnetic tableware or dishware holding system that is compatible with existing non-metallic support surfaces.

FIGS. 11-15 illustrate an alternate system 300 for holding tableware or dishware, such as the stemware, to a support surface, such as the table 26. For this system 300, the table 26 itself need not have a ferromagnetic or magnetic plate 60.

The base of the stemware is releasably attached to one side of a first attaching device, such as by a reusable adhesive, such as a round disc 304 of polyurethane sticky gel, or one of the aforementioned adhesives or adhesive fasteners. The round disc 304 on an opposite side thereof is attached to a portion of a supported body 308. The round disc 304 of polyurethane sticky gel can be washed with warm water and reused at least 200 times, and it is inexpensive and easy to replace.

The supported body 308, or coaster, includes a magnetic ring 312. The supported body 308 can be a plate that is square, round or any shape. The supported body 308 can be rigid or flexible.

The supported body 308 is magnetically attached to a support body or mat 316 that releasably attaches to the table. The support body 316 is composed of ferromagnetic material, such as a rubber steel component. The supported body 308 can be a plate that is square, round or any shape. In the illustrated embodiment the supported body 308 is round. The supported body can be rigid or flexible.

Figure 13:
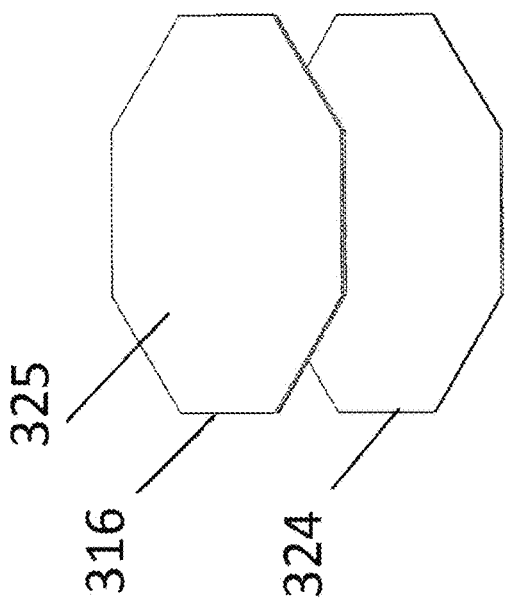
FIG. 13 is an exploded perspective view of the mat shown in FIG. 11.
Figure 11:
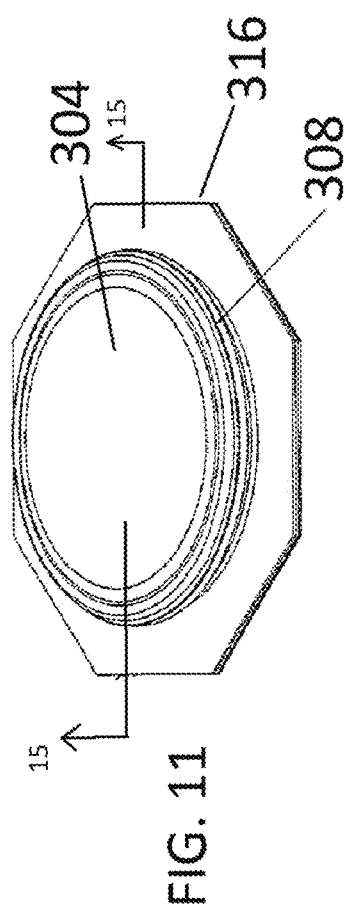
FIG. 11 is a perspective view of a coaster and mat combination according to another embodiment of the invention.
Figure 12:
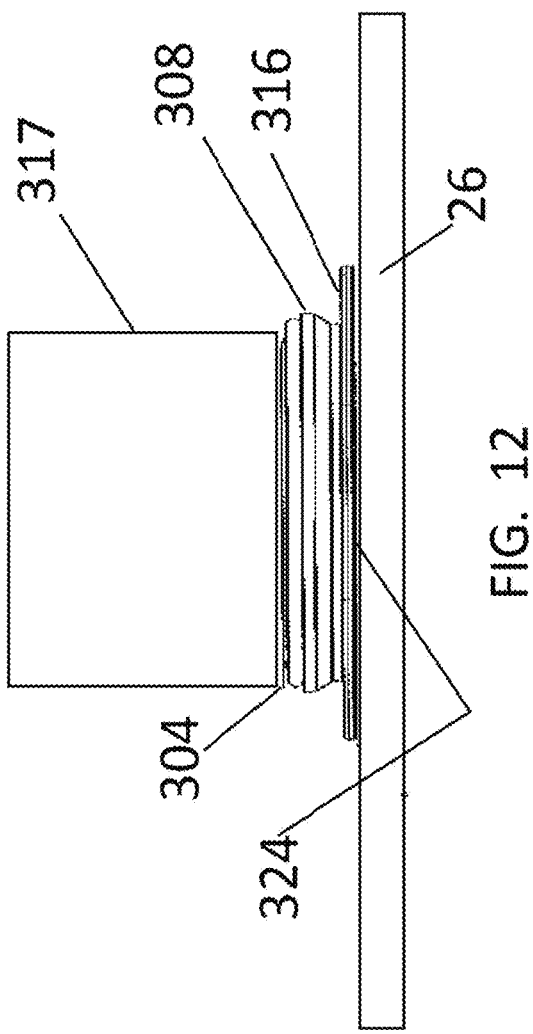
FIG. 12 is a side view of the coaster and mat combination of FIG. 11.

The supported body 308 set on the support body 316 is shown in FIGS. 11-13.

In FIG. 12 a cup 317 is shown held on the supported body 308 and the support body 316 is shown held on the table 26.

The support body 316 is attached to a second attaching device, such as by a reusable adhesive, such as a layer 324 of polyurethane sticky gel, or one of the aforementioned adhesives or adhesive fasteners. The support body 316 has a printable surface 325 that can be used for decorations, advertising, etc. The layer 324 of polyurethane sticky gel can releasably attach the support body 316 to the support surface, such as a top surface of a table 26. The layer 324 of polyurethane sticky gel can be washed with warm water and reused at least 200 times, and it is inexpensive and easy to replace. The layer 324 can be of the same size and shape as the support body 316, but other sizes and shapes are encompassed by the invention.

According to another embodiment, the layer gel 324 can be eliminated and the support body 316 can be composed of a no-slip material that has inherent surface gripping properties. The support body 316 can be made of an elastomeric material, such as rubber.

The support body 316 can be larger than the supported body 308, such as embodied as a placemat holding multiple supported bodies each holding a piece of tableware or dishware such as dishes and drinking glasses (not shown). The support body 316 can be of many shapes, such as round or square, or octagonal as shown in FIG. 11.

The embodiment of FIGS. 11-15 allows for a magnetic tableware or dishware holding system that is compatible with existing non-metallic support surfaces.

Figure 14:
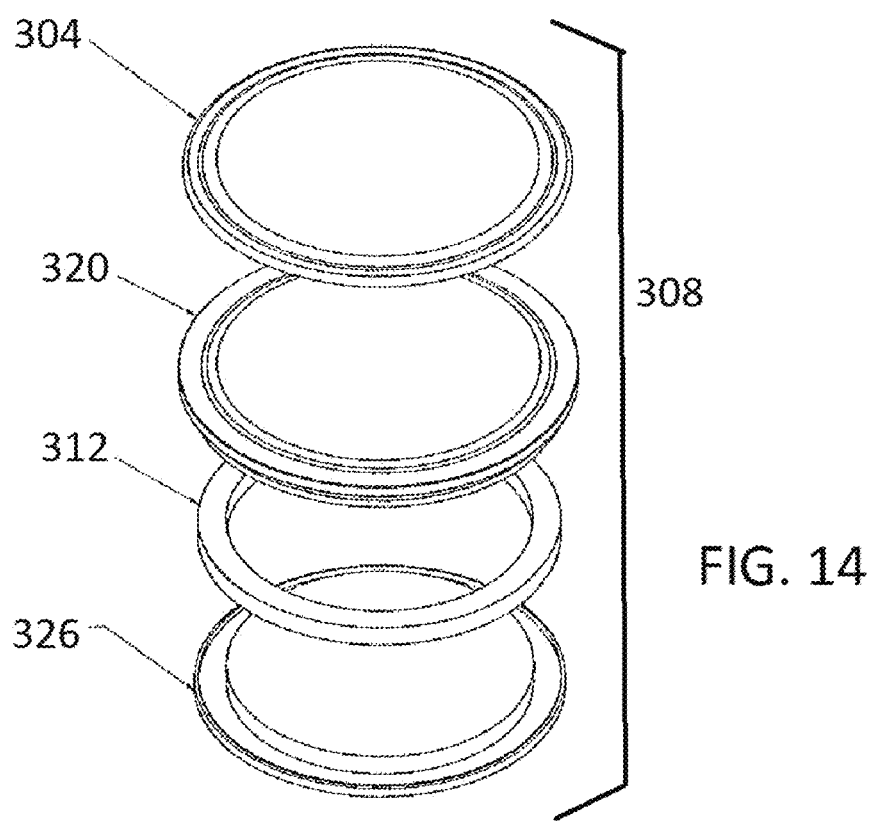
FIG. 14 is an exploded perspective view of an assembly of the coaster shown in FIG. 11.
Figure 15:
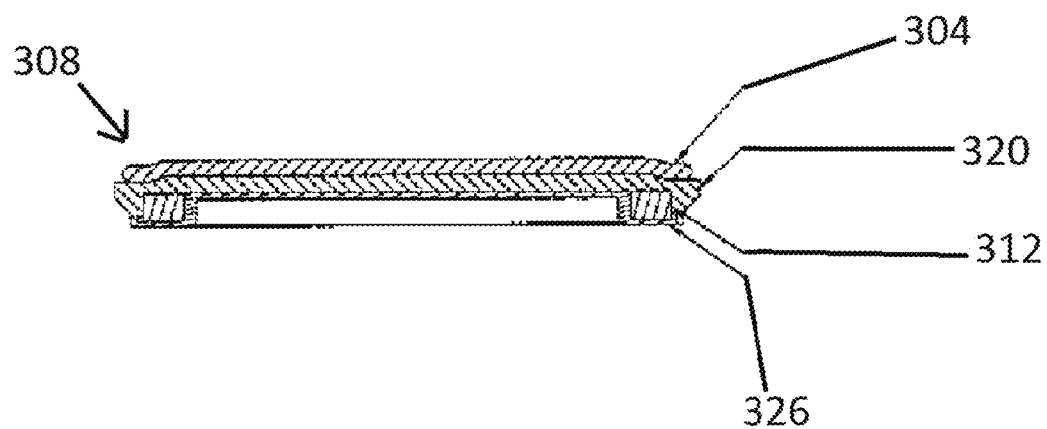
FIG. 15 is a sectional view of the coaster taken along line 15-15 of FIG. 11.

FIGS. 14-15 illustrate the supported body 308 in more detail. The supported body 308 includes the magnetic ring 312. The magnetic ring 312 can be a neodymium ring, such as a grade N35, nickel plated ring that measures 3.250" OD×2.750" ID×0.180". The invention encompasses other sizes of magnetic rings for larger dishware, serving ware, pots or pans, etc. The invention encompasses other strengths of the magnetic ring, including grade N42, N48, N52, for example, all of which are stronger magnets.

According to one aspect, the magnetic ring 312 spans the perimeter of the dish to which the supported plate 308 is secured, so when the boat lists from side to side, all sides of the dish are secured by magnetism.

The supported body 308 includes the disc 304 of polyurethane sticky gel, a rubber or plastic overmolded layer 320 forming a round top to the supported body 308 and covering a top and an upper part of an outside edge of the magnetic ring 312, and a rubber or plastic overmolded layer 326 forming a round bottom to the supported body 308 and covering a bottom and a lower part of the edge of the magnetic ring 312.

The support body 316 is advantageously formed of a rubber steel material, such as a rubber or plastic material formed with embedded ferromagnetic particles to make the support body magnetically attracted to the magnetic ring 312 of the supported body 308. The rubber steel is flexible and easy to stick on and peel off.

FIGS. 16-19 illustrate a further embodiment system 500 according to the invention. A drinking vessel, such as a wine glass 505. Other vessels are encompassed by the inventions including cups, double old fashioned glasses, beer steins, water glasses, cocktail glasses, etc. The wine glass 505 includes a base 508 supporting a stem 510 that supports a bowl portion 514. The base includes one or more cavities 516 that are open to a bottom face of the base. In one form, these cavities are cylindrical sockets, but other shapes are encompassed by the invention. In the illustrated embodiment the cavities 516 are arranged spaced apart by 120 degrees around a vertical centerline of the vessel 505.

A supported body 530 is arranged below the base 508. The supported body 530 is identical in construction to the supported body 308 except the top gel disc 304 is not used and three pegs 536 are formed extending vertically up from a top face of the supported body 530. The pegs can be upward extensions of the top overmolded plastic or rubber layer (304 in FIG. 15) of the supported body 530. The pegs 536 are arranged at 120 degrees around a circumference of the supported body, or otherwise arranged in a pattern and spacing that corresponds to the cavities 516 in the base 508. When the base is pressed to the supported body 530, the pegs 536 register with, and tightly fit into, the cavities 516, removably fixing the vessel 505 to the supported body 530.

Figure 19A:
FIG. 19A is a fragmentary sectional view taken generally along line 19-19 of FIG. 17.

FIG. 19A shows one type of peg 536. The peg is configured with a discontinuous and bowed sidewall 540. When the peg is forced into a cavity the bowed sidewall is compressed radially inward and resiliently grips the inside surface of the cavity. Other configurations are possible, including that the peg is solid and is composed of a compressible material, e.g., rubber.

Figure 18:
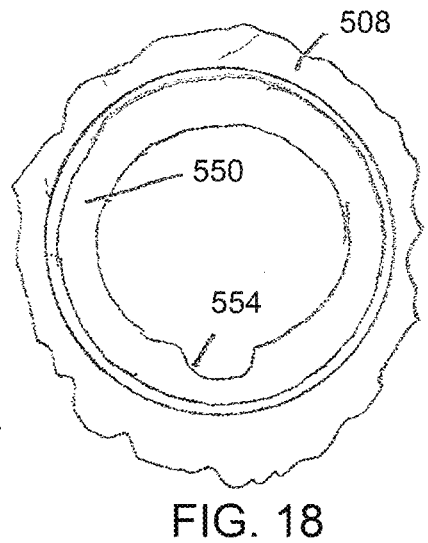
FIG. 18 is fragmentary plan view of the system shown in FIG. 16.
Figure 19B:
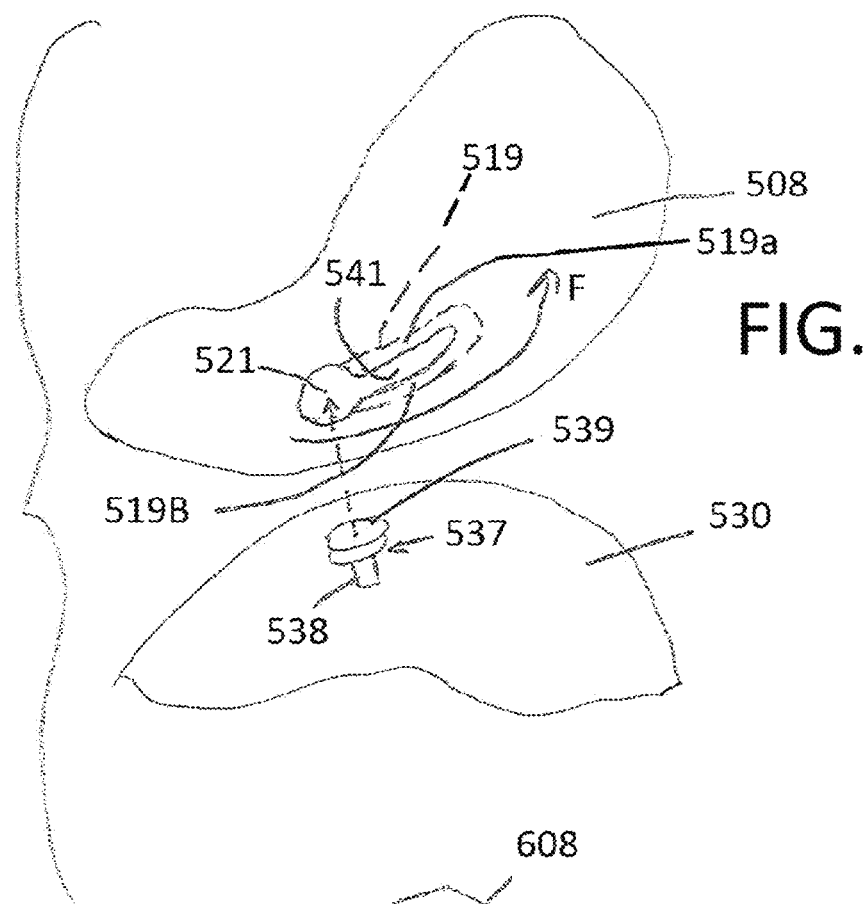
FIG. 19B is a fragmentary exploded perspective view of a bayonet connection between the supported body and the tableware or dishware as an alternate to the configuration of FIG. 19A.

FIG. 19B shows a bayonet style connection as an alternate to the peg connection of FIGS. 16-19A. In this alternative the each peg 536 is replaced by a peg 537 that has a neck 538 and an enlarged head 539. Each cavity 516 is replaced by a curved slot 519 that has an entrance 521 that is sized to receive the head and the slot sized to allow the head to rotate through the slot from the entrance when the supported body 530 is rotated in one direction F with respect to the base 508. The slot has a portion of its curvature that has overhanging cover portions 519a, 519b that overlie the head 539 but have a gap 541 therebetween that is only wide enough for the neck 538 to pass through. When fully rotated the head is trapped beneath the cover portions. The depth and/or the width of the slot 519 and gap 541 between the cover portions can be adjusted to create a tight fit when the supported body is fully rotated into a locked position with respect to the base. All three slots 519 corresponding to three pegs 537 are configured rotationally symmetrical so that a rotary locking movement is in the same direction for all three pegs.

One, two, three or more than three peg/cavity pairs can be used for the mechanical connection between the supported body 530 and the base 508. If one peg ad one cavity is used in lieu of the three shown, and advantageously is centrally located, then a threaded stud connection can be used instead of a peg, as shown in FIG. 21A.

Once the supported body 530 is snapped onto, or otherwise connected onto, the bottom of the base 508, the vessel 505 can be set on the support body 316, heretofore described. The magnet within the supported body 508 will attract the rubber steel of the support body 316 and hold the vessel down onto a table or other surface where the support body 316 is adhered.

At a top of the bowl portion 514, a removable lip or inwardly directed rim, such as a snap-on lip 550 is applied. The lip is frictionally or resiliently held onto a top circumferential edge region of the bowl portion 514. The lip includes a cut out spout portion 554 to allow a user to sip a drink in the bowl portion without spilling. The lip is particularly useful on a boat during heavy rocking waves to prevent sloshing of a drink out of the bowl portion 514.

Figure 21A:
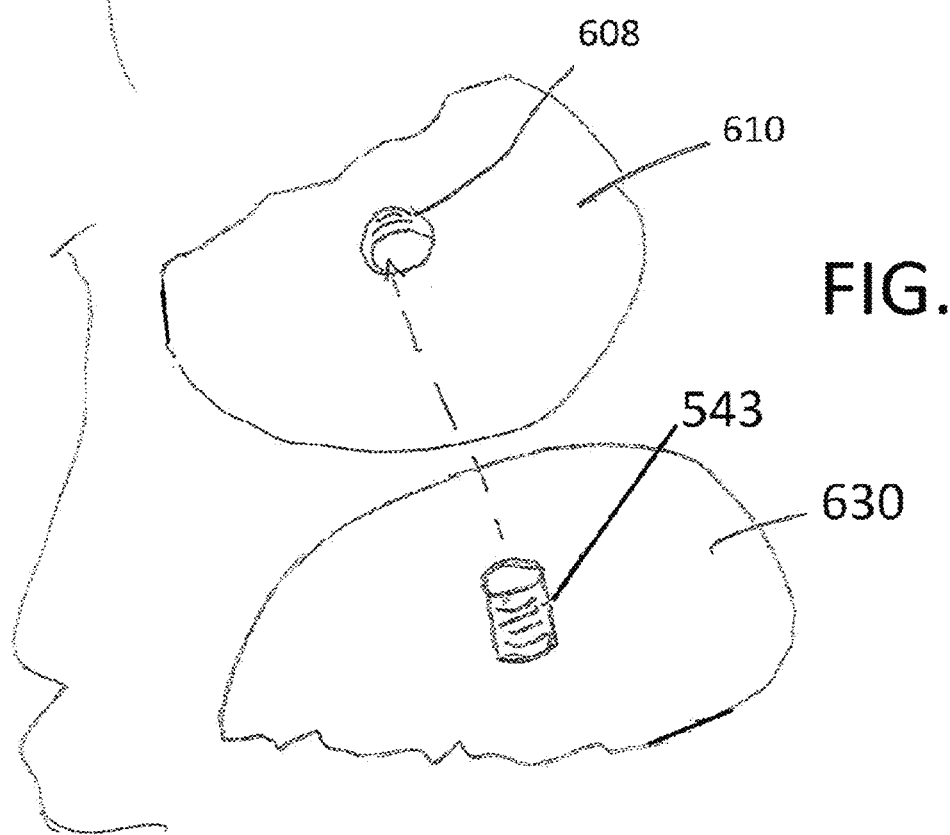
FIG. 21A is a fragmentary exploded perspective view of a threaded connection between the supported body and the tableware or dishware as an alternate to the configuration of FIG. 19A.
Figure 20:
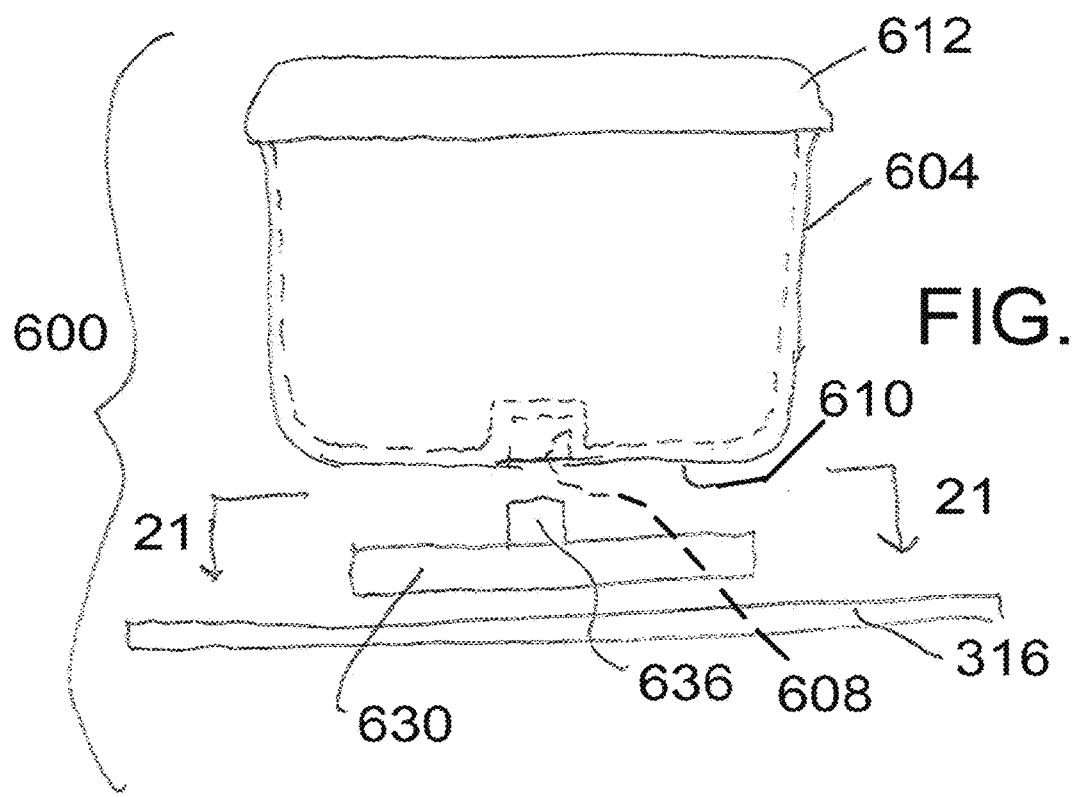
FIG. 20 is an exploded elevation view of a further alternate embodiment system of the invention applied to a bowl.
Figure 21:
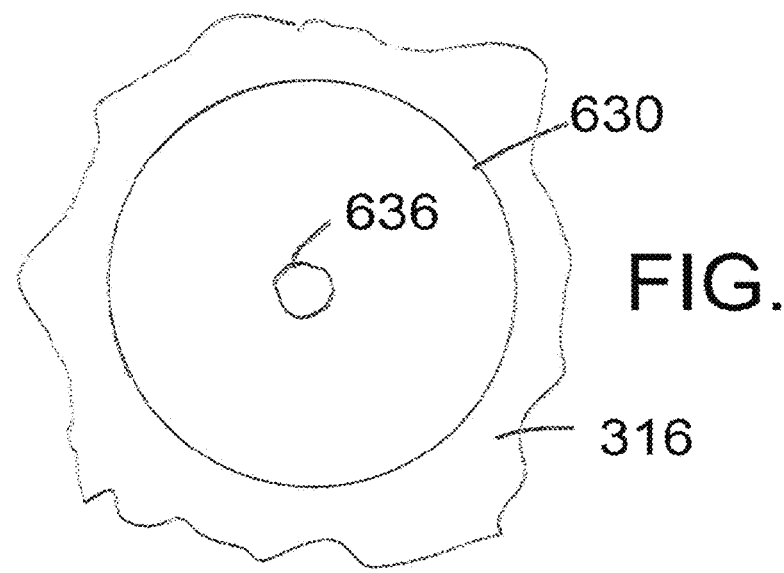
FIG. 21 is a fragmentary sectional view taken along line 21-21 of FIG. 20.

FIG. 20-21A show another embodiment system 600. In this embodiment a bowl 604, such as a serving bowl includes a cavity 608 centrally located into a bottom wall 610 of the bowl open downwardly. In one form, this cavity is a cylindrical socket, but other shapes are encompassed by the invention.

The bowl also includes a removable lip or inwardly directed rim, such as a snap on lip 612 that extends toward a center of the bowl and is useful to prevent liquid held in the bowl from sloshing and spilling out of the bowl during heavy rocking waves when used on a boat. The plan view of the bowl is shown in FIG. 23.

Figure 16:
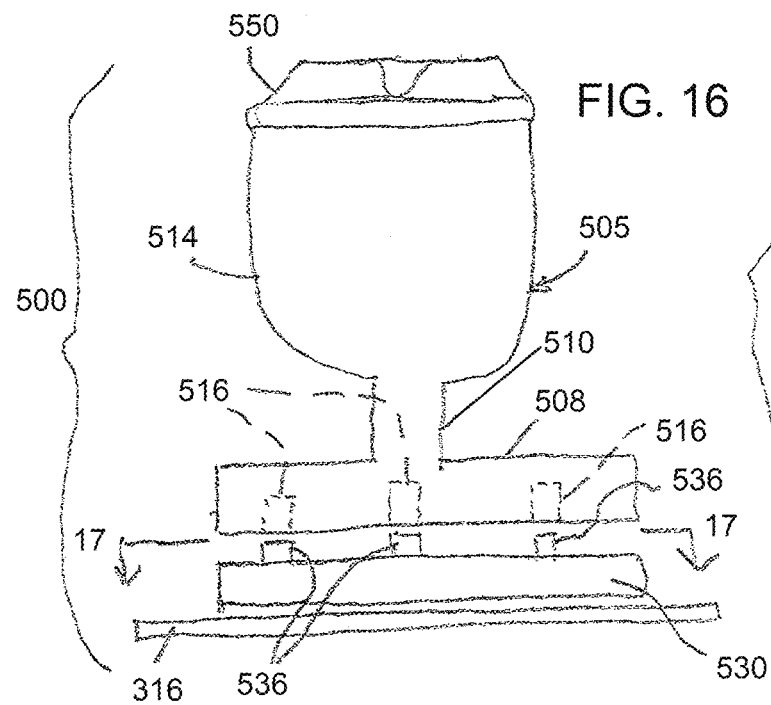
FIG. 16 is an exploded elevation view of a further alternate embodiment system of the invention applied to a drinking vessel.
Figure 17:
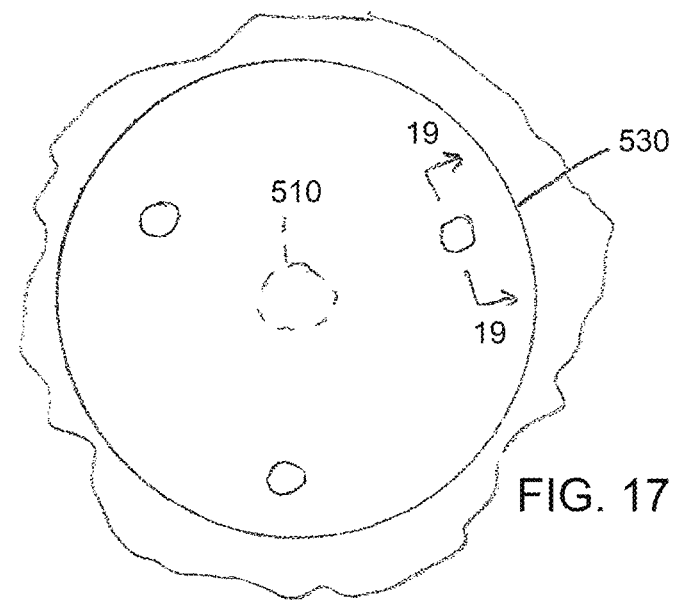
FIG. 17 is a fragmentary sectional view taken generally along line 17-17 of FIG. 16.

A supported body 630 is identical to the supported body 530 except only one central peg 636 is used. The peg 636 is centrally located on the supported body 630 and sized and shaped to tightly fit into the cavity 608. The peg 636 can be configured as described for the peg 536 in the prior embodiment of FIGS. 16-17, 19A, 19B or 21A. Although one peg/cavity pair is shown, more than one peg/cavity pair can be used such as shown in FIGS. 16 and 17.

FIG. 21A shows a threaded connection as an alternate to the peg connection of FIG. 19A. In this arrangement the peg 636 is replaced by a threaded stud 543 and the cavity 608 is a threaded cavity. The supported body 630 is rotated with respect to the bowl to thread the stud into the cavity to fix the supported body to the bowl.

Figure 22:
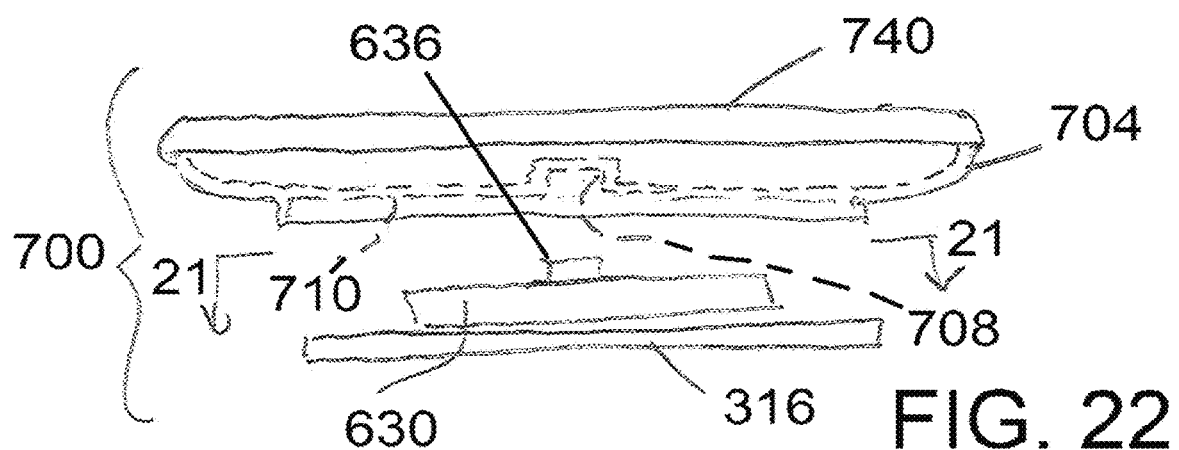
FIG. 22 is an exploded elevation view of a further alternate embodiment system of the invention applied to a dinner plate.
Figure 23:
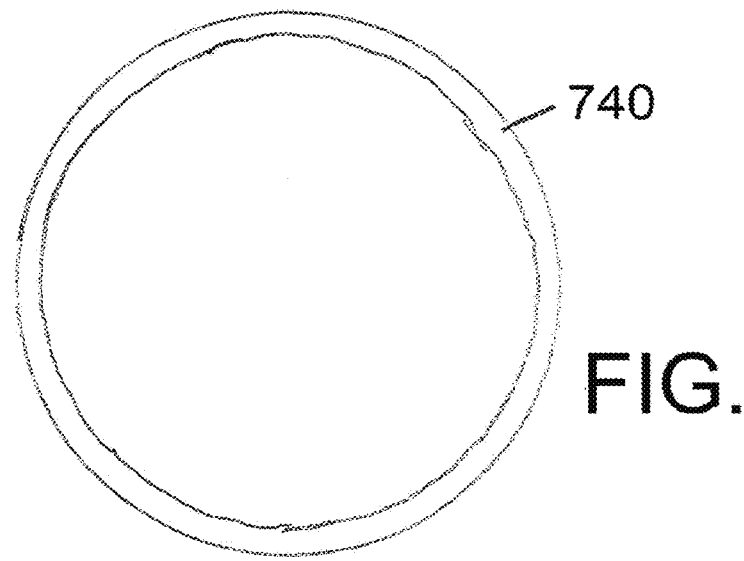
FIG. 23 is a plan view of the embodiment of FIG. 22.

FIGS. 22 and 23 show an alternate embodiment system 700 wherein a dinner plate 704 or other substantially low profile tableware or dishware, such as platters, can be configured with a central cavity 708 into a bottom wall 710 thereof, open downwardly. In one form, this cavity is a cylindrical socket, but other shapes are encompassed by the invention. The supported body 630 is as described in the previous embodiment. The peg 636 is centrally located as shown in FIG. 18 to register with the cavity 708. The peg 636 is sized and shaped to tightly fit into the cavity 708 in the same way as previously described as fit into the cavity 608. When the supported body is tightly fit onto the bottom of the plate 704, the plate can be supported with the supported body magnetically holding the plate to the support body 316 which is adhered to a table or other surface.

The peg and cavity can be replaced by any of the alternate mechanical connections previously described in FIGS. 19A, 19B and 21A. Although one peg/cavity pair is shown, more than one peg/cavity pair can be used such as shown in FIGS. 16 and 17.

The plate can be provided with a removable lip or inwardly directed rim, such as a snap on lip 740 that extends inwardly and helps prevent any sloshing and spilling of liquid held on the plate during rough waves when used on a boat.

The described embodiments of FIGS. 16-23 include alternate configurations. For example, the three pegs and three corresponding cavities shown in FIGS. 16 and 17 could be replaced with one peg as per the embodiments of FIGS. 20-22. Alternatively, the one peg, one cavity arrangements of FIGS. 20-22 could be replaced with the three pegs, three cavities arrangements shown in FIGS. 16 and 17. Where three pegs and corresponding three cavities are shown, a different number could be used such as two pegs and two corresponding cavities, or more than three pegs and more than three corresponding cavities.

The embodiments of FIGS. 16-23 provide advantage to using dishware or tableware on a boat. By the use of removable annular lips on dishware or tableware, sloshing and spillage can be prevented on a rocking boat, while the lips can be removed to more easily and thoroughly clean the dish in the dishwasher or by hand. Dishes with lips can be more easily fit into a dishwasher and water won't be trapped behind the lips during cleaning. Additionally, storage efficiency is critical on a boat. Without being able to remove lips, dishware cannot be nested and storage space must be increased or the number of dishes reduced. Additionally, when the boat is on calm waters, the lips can be removed for a more traditional aesthetic look of the set table. The removable lips can be used on any of the embodiments of this application.

Additionally, by making the supported body mechanically removable from the vessel, bowl of dish, the vessel, bowl or dish can be washed without the supported body. The magnet within the supported body can avoid the high temperatures and conditions of the dishwashing process. Additionally, since the vessels, bowls or dishes are attached by having a cavity, rather than a protruding part, these items retain a flat bottom without being attached to a supported body. These items can be used easily without the magnetic supported body, and thus can be used also as non-boating dishware or tableware. Thus, the same set of dishware or tableware can serve double duty as boating or non-boating dishware or tableware.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A system for adhering tableware or dishware to a table, comprising:
   a supported body having a first ferromagnetic component;
   a support body having a second ferromagnetic component wherein one of the first and second ferromagnetic components is a magnetic component and a respective other one of the first and second ferromagnetic components is magnetically attracted to the magnetic component;
   a reusable adhering component arranged on the supported body between the tableware or dishware and the first ferromagnetic component; wherein the adhering component comprises a polyurethane sticky gel.

2. The system according to claim 1, wherein the magnetic component comprises a ring.

3. The system according to claim 1, wherein the support body comprises a rigid plate.

4. The system according to claim 1 further comprising a removable lip that can be snapped onto a rim of dishware or tableware that has a bowl portion for holding a liquid.

5. A system for adhering tableware or dishware to a table, comprising:

a supported body having a first ferromagnetic component;
a support body having a second ferromagnetic component wherein one of the first and second ferromagnetic components is a magnetic component and a respective other one of the first and second ferromagnetic components is magnetically attracted to the magnetic component;
a reusable adhering component arranged on the supported body between the tableware or dishware and the first ferromagnetic component; wherein the support body comprises a mat adhered to a table using a polyurethane sticky gel.

6. The system according to claim 5, wherein the mat comprises a flexible mat.

7. A system for adhering tableware or dishware to a table, comprising:
a supported body having a first ferromagnetic component;
a support body having a second ferromagnetic component wherein one of the first and second ferromagnetic components is a magnetic component and a respective other one of the first and second ferromagnetic components is magnetically attracted to the magnetic component;
a reusable mechanical fastening device arranged between the tableware or dishware and the first ferromagnetic component, wherein the reusable mechanical fastening device comprises a projection on the supported body, and a cavity that receives and engages the projection located into a bottom of the tableware or dishware.

8. The system according to claim 7, wherein the magnetic component comprises a ring.

9. The system according to claim 7, wherein the projection comprises a peg on the supported body sized and shaped to tightly fit into the cavity.

10. The system according to claim 9, wherein the magnetic component comprises a ring.

11. The system according to claim 7, wherein the cavity is threaded and the projection comprises a threaded stud on the supported body sized and shaped to thread into the cavity.

12. The system according to claim 11, wherein the magnetic component comprises a ring.

13. The system according to claim 7 wherein the support body comprises a mat adhered to a table using a polyurethane sticky gel.

14. The system according to claim 13, wherein the mat comprises a flexible mat.

15. The system according to claim 7, wherein the support body comprises a rigid plate.

16. The system according to claim 7, wherein the cavity comprises a bayonet cavity and the projection comprises a headed peg on the supported body sized and shaped to be rotationally locked into the bayonet cavity.

17. The system according to claim 16, wherein the magnetic component comprises a ring.

18. The system according to claim 7 further comprising a removable lip that can be snapped onto a rim of dishware or tableware that has a bowl portion for holding a liquid.

19. A system for adhering tableware or dishware to a table, comprising:
a supported body having a first ferromagnetic component;
a support body having a second ferromagnetic component wherein one of the first and second ferromagnetic components is a magnetic component and a respective other one of the first and second ferromagnetic components is magnetically attracted to the magnetic component;
a reusable mechanical fastening device arranged between the tableware or dishware and the first ferromagnetic component.

20. The system according to claim 19, wherein the magnetic component comprises a ring.

* * * * *